Sept. 2, 1952 F. R. FITZGERALD 2,609,183
CONTROL APPARATUS
Filed Sept. 2, 1948 2 SHEETS—SHEET 1

Inventor
FRANK R. FITZGERALD
BY George H. Fisher
Attorney

Sept. 2, 1952 F. R. FITZGERALD 2,609,183
CONTROL APPARATUS
Filed Sept. 2, 1948 2 SHEETS—SHEET 2
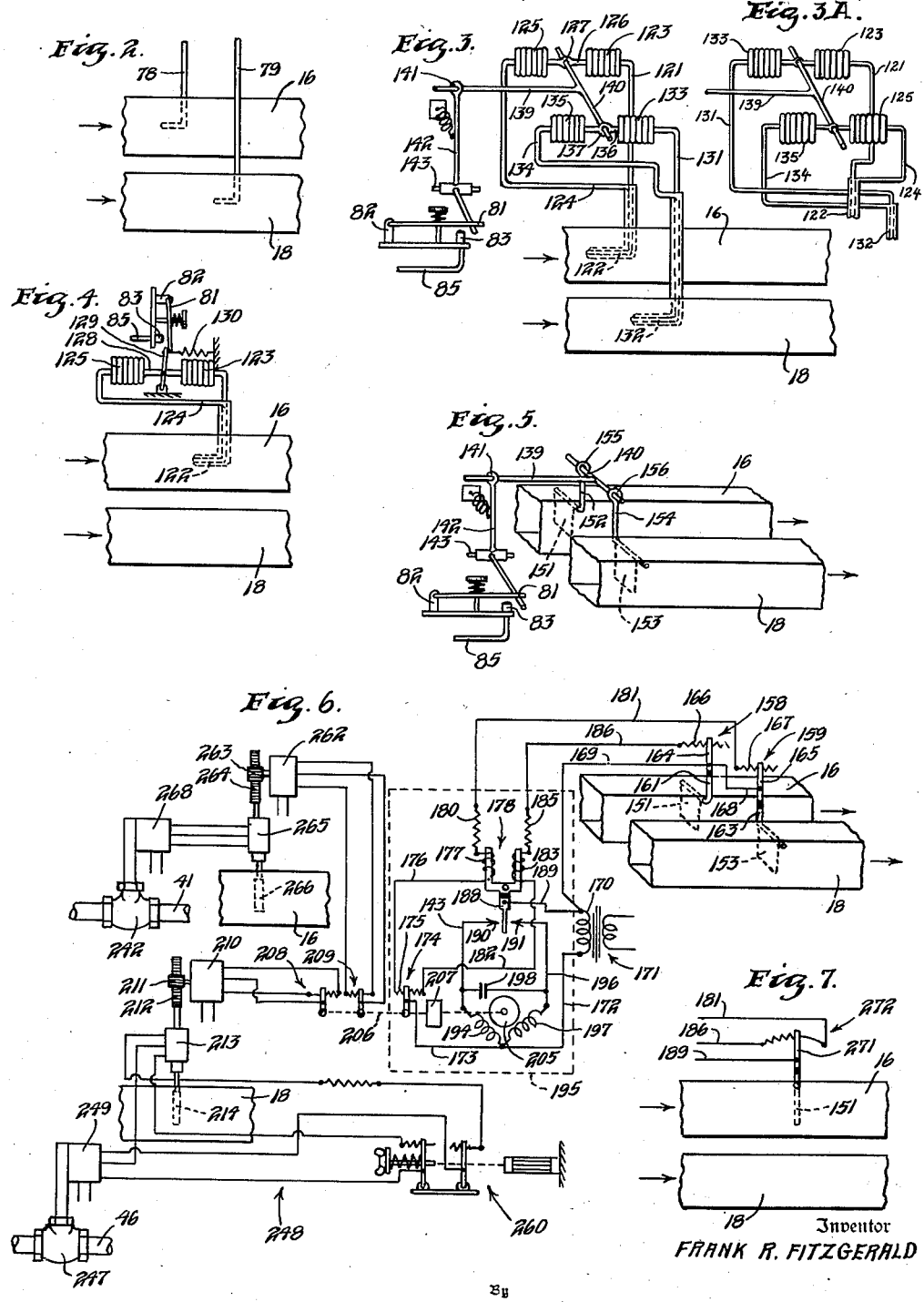
Inventor
FRANK R. FITZGERALD
By George H. Fisher
Attorney Patented Sept. 2, 1952

2,609,183

UNITED STATES PATENT OFFICE 2,609,183

CONTROL APPARATUS

Frank R. Fitzgerald, El Monte, Calif., assignor to Minneapolis-Honeywell Regulator Company, Minneapolis, Minn., a corporation of Delaware Application September 2, 1948, Serial No. 47,452

13 Claims. (Cl. 257—3)

The present invention relates to the control of air conditioning apparatus for a plurality of zones in response to the average requirements for those zones.

In large buildings having a plurality of zones which have somewhat different heating or cooling requirements, a double duct air conditioning system is frequently used. In this system, one of the ducts carries relatively hot air and the other duct relatively cold air, each of the ducts being suitably connected through mixing dampers with each of the zones, the mixing dampers being controlled by individual zone thermostats. With this arrangement, if a zone is relatively cool, the mixing damper will be adjusted to reduce the supply of cold air and increase the supply of hot air and, obviously, reduce the supply of hot air and increase the flow of cold air when the zone is relatively warm. If the hot air is hot enough to meet the extreme heating load and the cold air cool enough to meet the extreme cooling load, it is apparent that the dampers must, at times, operate near their fully closed position and thus become difficult to control because of the well known flow characteristics of dampers. Also, since such a system must provide for the total required air volume traversing each duct separately at extreme heating load and at extreme cooling load, respectively, each duct must be sized to carry the total volume of air. With the present invention, the load is better distributed between the ducts hence they may be made somewhat smaller, with a consequent saving in cost. Further, because a system such as described tends to circulate both hotter and colder air than actually needed, operating economy is sacrificed to flexibility. In the present invention, the air is tempered no more than necessary, resulting in savings in both initial and operating costs and an improvement in control.

It is thus an object of the present invention to improve the double duct system of air conditioning by making it easier to control, more economical to operate, and in some instances more economical to install.

It is a further object to provide control apparatus for a double duct air conditioning system which requires no more heating or cooling of the air delivered than is necessary to meet the zone needs.

It is another object of this invention to provide control apparatus for a double duct air conditioning system effective to vary the temperature of the air delivered by said ducts in response to differences in air velocity in said ducts.

It is a similar object to provide control apparatus for such an air conditioning system responsive to the relative volumes of air being delivered by the respective ducts.

It is a further object to provide control apparatus for a double duct air conditioning system wherein a device responsive to temperature in each duct controls its respective temperature changing apparatus and wherein said devices may be reset to control to different temperature values in response to the different volumes of air passing through said ducts.

It is a further object to provide control apparatus for a double duct air conditioning system wherein a device responsive to temperature in each duct controls its respective temperature changing apparatus and wherein said devices may be reset to control to different temperature values in response to the different velocities of air passing through said ducts.

It is also an object to provide a control system for a double duct air conditioning system wherein the temperatures of the delivered air are normally determined by the heating or cooling requirements of the zone but wherein said delivered air temperatures may also be varied in response to relative humidity.

It is an additional object to provide control apparatus for a double duct air conditioning system comprising air velocity responsive means for determining the system load.

These and other objects will appear upon a study of the following specification and drawings wherein:

Figure 2 is a schematic view of a modification of part of the apparatus of Figure 1.

Figure 3 is a schematic view similar to Figure 2 showing a further modification of the apparatus of Figure 1.

Figure 3A is a schematic view of a modified arrangement of the bellows devices of Figure 3.

Figure 4 is a schematic view of a modification of Figure 1 wherein electrical apparatus is used instead of the pneumatic apparatus of the previous views.

Figure 5 is a schematic view of a differential velocity apparatus for the system of Figure 1 using swinging vanes.

Figure 6 is a diagrammatic view of an electrical system similar to the system of Figure 1.

Figure 7 is a schematic view of modified arrangement for the system of Figure 6 wherein velocity is sensed in only one duct.

Figure 1:
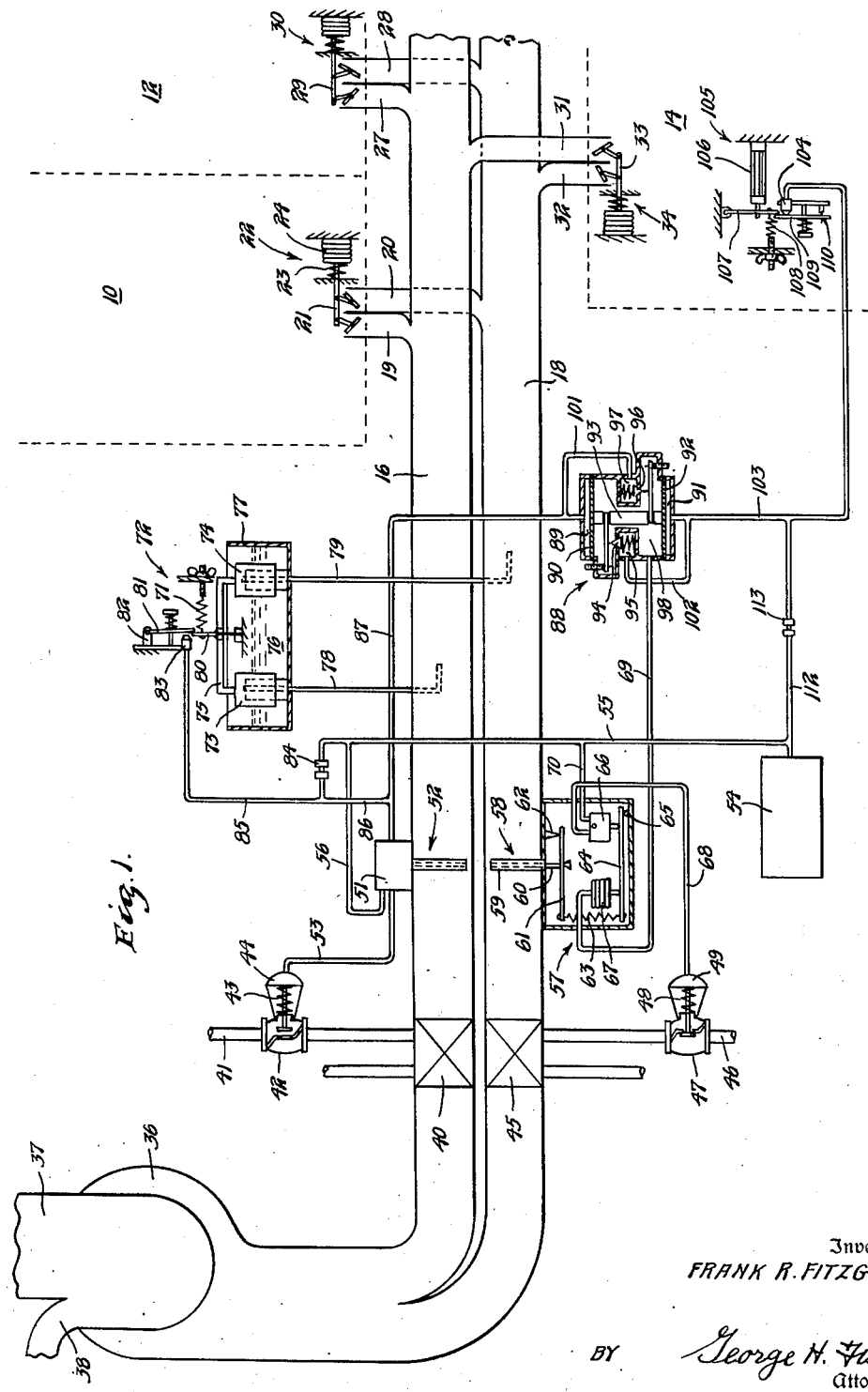
Figure 1 is a schematic view of a preferred form of the present invention.

In Figure 1, rooms or zones 10, 12, and 14, as well as other zones, not shown, are supplied with tempered air by a double duct air distributing system comprising a warm air duct 16 and a cold air duct 18. Branch ducts 19 and 20, controlled by mixing dampers 21, are connected to ducts 16 and 18, respectively, the mixing dampers 21 being so constructed that duct 19 is opened as duct 20 is closed and vice versa. Dampers 21 are operated by a thermostatic device 22 comprising a spring 23 and an expansible bellows 24, the force exerted by the spring tending to move dampers 21 in a direction to open duct 19 and close duct 20, and the expansive force of bellows 24 tending to adjust dampers 21 in a direction to close duct 19 and open duct 20. Obviously, thermostatic device 22 is illustrative only and dampers 21 may be manually operated or may be operated by either a pneumatic or an electric motor controlled by a suitable thermostat. Branch ducts 27 and 28, controlled by mixing dampers 29, are connected to ducts 16 and 18, respectively, and dampers 29 are operated by a thermostatic device 30 similar to 22 just described. Likewise, branch ducts 31 and 32, controlled by mixing dampers 33, are connected to ducts 16 and 18, respectively, and damper operating thermostatic device 34 is similar to devices 22 and 30.

Air is supplied to ducts 16 and 18 by a blower 36, the intake of which is connected to a return air duct 37 and an outside or fresh air duct 38. While dampers are generally provided for varying the proportion of fresh air and return air, such dampers are not shown because of space limitations and because they form no essential part of this invention but it is obvious that they may be used if desired. The air delivered through duct 16 may be heated by a suitable heat exchanger or steam coil 40 disposed in said duct and supplied with steam through pipe 41 under the control of a normally open throttling valve 42 having a spring 43 for urging the movable valve member in an opening direction and having a pneumatic motor 44 for opposing the spring 43 and closing the valve. Likewise, the air delivered through duct 18 may be cooled by a suitable heat exchanger or cooling coil 45 supplied with chilled brine or the like from a source, not shown, through pipe 46 under the control of a normally closed throttle valve 47, valve 47 including a spring 48 for urging the movable valve member to a closed position and pneumatic motor 49 being arranged to oppose spring 48 and open the valve. Obviously, any other conventional and controllable heating and cooling apparatus may be substituted for that above described.

The pressure applied to motor 44 of valve 42 is regulated by a submaster type thermostat 51 having its stem portion 52 arranged in duct 16 for responding to the temperature of the air in said duct downstream from coil 40, thermostat 51 being connected to motor 44 by tube 53. Thermostat 51 receives its air supply for a suitable source such as 54 through pipe 55 and tube 56. The pressure imposed on motor 49 of valve 47 is likewise controlled by submaster thermostat 57, identical with 51, and having an insertion stem portion 58 extending into duct 18 and responding to the temperature of the air in said duct downstream from cooling coil 45. Thermostat 57, and this description applies equally well to 51, comprises a tube portion 59 having a relatively high temperature coefficient of expansion and a relatively non-expansible rod portion 60 anchored to the bottom of the tube. Rod 60 is connected through suitable knife edge contacts to lever 61 pivoted on knife edge 62 and urged in a counterclockwise direction by a tension spring 63. As thus arranged, upon a temperature rise, tube 59 expands and moves rod 60 in a direction to pivot lever 61 in a clockwise direction whereas, upon a temperature fall, tube 59 contracts and permits spring 63 to rotate lever 61 in a counterclockwise direction. The other end of spring 63 is connected to lever 64 pivoted at 65 and bearing against the operating stem of valve unit 66 and a set-up bellows 67. Valve unit 66 is of a conventional sort and is so arranged that when lever 64 is in a neutral position, there is no change in branch line pressure in tube 68 connecting valve unit 66 to motor 49. However, if lever 64 be rotated in a clockwise direction, thus moving the operating stem of the valve inward, the pressure in branch 68 is increased whereas, if lever 64 be moved in a counterclockwise direction, the pressure in branch 68 will be diminished. Set-up bellows 67 is arranged to oppose spring 63 by an amount depending upon the pressure imposed on it through tube 69, a relatively high pressure in bellows 67 tending to move lever 64 in a counterclockwise direction to thus bleed the pressure in branch 68 to zero hence, in effect, to shift the control point of the instrument upwardly by requiring a greater elongation of tube 59 to restore lever 64 to its neutral position, the greater elongation of tube 59 resulting in a clockwise movement of lever 61 and an increasing of the tension of spring 63. The valve unit 66 of device 57 obtains its supply of air from source 54 through pipe 55 and tube 70. For a fuller description of submaster thermostats 51 and 57, reference is made to Patent 2,363,595, issued to F. D. Joesting, November 28, 1944. Obviously, any other suitable thermostats subject to resetting or remote adjustment in a manner similar to these thermostats can be substituted for devices 51 and 57.

The resetting, or the remote adjustment, of thermostats 51 and 57 is accomplished by a differential pressure responsive device 72. Device 72 comprises a pair of inverted cup-like members 73 and 74 attached to a pivoted beam 75 and arranged with their lower and open ends immersed in oil 76 in a suitable receptacle 77. A pressure sensing conduit 78 is arranged with one end opening into conduit 16 and its other end extended above the surface of oil 76 under cup-like member 73, conduit 79 being similar to 78 but having one end opening into conduit 18 and its other end terminating above the surface of oil 76 under cup-like member 74. As thus arranged, the static pressure in conduit 16 is communicated to the under side of cup 73 and the static pressure in conduit 18 is communicated to the under side of cup 74, and any difference in these pressures will tend to cause a pivoting of lever 75. An upwardly extending member 80 is attached to lever 75 and is arranged to contact valve plate 81 pivoted at 82 and spring urged against a nozzle 83 to normally close said nozzle. An adjustable spring 71 is provided for biasing extension member 80 in a direction to move valve plate 81 away from nozzle 83, this spring having slightly greater strength than the spring holding the valve plate 81 against the nozzle, so that plate 81, when the pressures under 73 and 74 are equal, will be held in a partially open position. Then, if the pressure in 73 is slightly above that in 74 the nozzle 83 will be completely opened whereas, if the pressure in 74 exceeds that in 73, the nozzle 83 can be completely closed by its spring. Nozzle 83 and its coacting nozzle plate 81 controls the bleeding of air from tube 85, the air being obtained from source 54 through pipe 55 and a restriction 84. Tube 85 also connects with tube 86 leading to the reset bellows of thermostat 51 and to tube 87, which may connect with tube 69 but which is shown connected to a relay 88. As thus arranged, a restricted quantity of air is permitted to pass through restrictor 84 and may be bled away through nozzle 83, when the nozzle plate is in a remote position, thereby causing a minimum pressure in the tubing downstream from the restrictor 84 and causing a minimum pressure in the set-up bellows of thermostats 51 and 57. However, if plate 81 seals off nozzle 83, the air pressure builds up in the connecting tubing downstream from the restrictor until it reaches the full line pressure, and the set-up bellows of thermostats 51 and 57 then exert their maximum force to reset or adjust the said thermostats a maximum amount. For a fuller description of the differential pressure responsive device 72, reference is made to Patent 2,210,868, issued August 6, 1940.

Rather than connecting tube 87 to tube 69 and thus changing the pressure in bellows 67 in accordance with device 72, a diverting relay 88 is interposed for a purpose which will appear. Diverting relay 88 comprises a first pressure chamber 89 bounded in part by a flexible diaphragm 90. A similar pressure chamber 91 including a flexible diaphragm 92 is arranged oppositely to the first named pressure chamber, with a connecting member 93 being arranged between the diaphragms 90 and 92. Member 93 is connected to open valve 94 in valve chamber 95 when it is shifted downwardly and to open valve 96 in valve chamber 97 when it is shifted upwardly. Valves 94 and 96 control the air passages from their respective valve chambers into chamber 98, to which tube 69 is connected. Tube 87 is connected to pressure chamber 89 and a branch tube 101 also connects 87 to valve chamber 97. Tubes 102 and 103 connect valve chamber 95 and pressure chamber 91 to nozzle 104 of a relative humidity responsive device 105.

Humidity responsive device 105 also includes a conventional hair element 106 which is attached to a pivoted lever 107, lever 107 being urged in a clockwise direction by a spring 108. The lower extremity of lever 107 is arranged to engage plate 109, pivoted at 110 and spring urged in a direction to close nozzle 104. Thus, when the relative humidity is relatively low, element 106 is contracted and lever 107 is rotated in a counterclockwise direction to thus permit plate 109 to be pressed against nozzle 104 by its spring and prevent the bleeding of air from said nozzle. Air is supplied to tube 103 from source 54 through a tube 112 in which is located a restrictor 113. With this arrangement, when nozzle 104 is closed, due to a relatively low humidity, full line pressure builds up in tubes 102 and 103 and in chambers 95 and 91. With a higher pressure in chamber 91 than in 89, member 93 is shifted upwardly, valve 96 is opened and communication exists between tube 87, tube 101, chamber 98 and tube 69, differential pressure responsive device 72 thus controlling the resetting of thermostat 57. However, when the relative humidity reaches a predetermined high value and nozzle 104 is opened due to the extension of element 106, the pressure in chamber 91 is reduced and the pressure in chamber 89 may then exceed that in 91. When the pressure in chamber 89 exceeds that in chamber 91, member 93 is shifted downwardly, closing valve 96 and opening valve 95 to thereby place tube 69 in communication with tube 103 through chamber 98 and valve 94, thus placing device 105 in control of the resetting of thermostat 57.

The design of the present system, as an example only, is such that when outside temperature is 30° F., temperature of the air supplied to the zones should be approximately 110°, and when the outside temperature is 100°, temperature of the air supplied in the zones should be approximately 55°.

In operation, it may be assumed that blower 36 is operating and is circulating about one-fourth fresh air and three-fourths return air through ducts 16 and 18 to the several zones including 10, 12, 14. Thermostat 51 may be adjusted to control at a temperature of 23° with 100° set-up possible by its resetting bellows so that, with maximum pressure at its resetting bellows, it will control at 123°. Thermostat 57 may be adjusted to control at 48° with a 50° set-up, so that it will control at 98° with a maximum pressure in its bellows 67. Differential pressure responsive device 72 may be set to provide maximum set-up air pressure in tube 85 when conduit 16 is carrying 80 per cent of the total air volume being supplied by blower 36; and minimum air pressure in tube 85 when conduit 18 is carrying 80 per cent of the total air volume. With the apparatus adjusted as described, and with relative humidity responsive device 105 adjusted to maintain its nozzle 104 closed at relative humidities under 60 per cent, it may next be assumed that equal air pressures exist in conduits 16 and 18, due to the average openings of dampers 21, 29 and 33 causing equal flows from the two conduits.

Under these conditions, as above discussed, it may be assumed that valve plate 81 is slightly spaced from nozzle 83 so that the resulting pressure in tube 85, the resetting bellows of 51, chamber 89 and bellows 67 is eight pounds per square inch. At this pressure, device 51 is reset to control at 73° and device 57 is also reset to control at 73°. If the mixture of outside air and return air is below 73°, then thermostat 51 controls valve 42 to permit steam flow through pipe 41 and coil 40 to heat the air and bring it to the desired 73°. With the air passing through coil 45 under 73° in temperature, tube 59 is relatively contracted so that lever 64 tends to be rotated in a counterclockwise direction, this direction of rotation being recognized as that which bleeds down the pressure in branch tube 68 leading from valve unit 66 to valve motor 49, hence spring 48 is able to keep valve 47 closed. Therefore, although device 57 is adjusted to control at 73°, the air to which it is exposed is at a lower temperature without any cooling, hence no further cooling is provided.

The relative humidity may be assumed to be lower than the 60 per cent for which device 105 is set, hence nozzle 104 is closed, the full supply pressure in chamber 91 exceeds that (eight pounds per square inch) in 89 so that valve 96 is open to thereby place tube 87 in communication with tube 69 so that device 72 controls the resetting of device 57.

If the temperature should now fall in zones 10 and 14, the contraction of the bellows of devices 22 and 34 will cause a closing of branch conduits 20 and 32 and the wider opening of conduits 19 and 31, to thus introduce more heat. The 73° air in duct 16 does not possess much heat for raising the temperatures in the zones but the wider opening of branch ducts 19 and 31 leading from conduit 16 permits a freer flow of air from this conduit and thus a slight reduction in the pressure in said conduit. Further, the closing of ducts 20 and 32 causes added restriction to flow from duct 18 and thereby causes a slight increase in the pressure in said duct 18. As a result, the pressure in cup 74 is increased above that in 73 thereby causing a counterclockwise rotation of lever 75 and a consequent closing movement of valve plate 81 toward nozzle 83. This causes the pressure in tube 85 to increase with a consequent increase in the pressure in the resetting bellows of devices 51 and 57. An increase in the resetting pressure of thermostat 51 causes it to control at a higher temperature hence it operates to decrease the pressure in branch conduit 53 to permit spring 43 to more widely open valve 42 and thereby increase the heat delivered to the air passing through coil 49. At the same time, the temperature at which device 57 controls is also increased but, as the controlling action amounts to a lowering of the branch pressure, and valve 47 was already closed due to the low branch pressure, this valve stays closed and there is no cooling provided.

Should the average zone temperature diminish sufficiently, so that all the mixing dampers are adjusted to permit 80 per cent average flow of air from duct 16 and 20 per cent average flow from duct 18, then the pressure difference in device 72 will be sufficient to completely close nozzle 83, with a consequent maximum resetting of thermostats 51 and 57. At this point, device 51 will control valve 42 to require 123° air in duct 16 whereas device 57 will require cooling of the air in duct 18 to 98° F. As 98° is above the temperature of the air being delivered from blower 36, valve 47 remains closed. With the apparatus controlling as described the mixture of air supplied from conduits 16 and 18 will be not less than 110° when the heating is a maximum, thus meeting the design requirements without extreme positioning of the mixing dampers and without undue deviation of room temperatures.

Now, instead of zones 10, 12 and 14 falling in temperature, let it be assumed that they tend to be too warm. With the temperature in the zones above that desired, the devices 22, 30 and 34 will operate to drive the dampers for ducts 19, 27 and 31 toward closed positions, at the same time opening the dampers for ducts 20, 28 and 32. The restricted flow from duct 16 and the free flow from duct 18 then causes the pressure in duct 16 to be higher than that in 18, resulting in lever 75 of device 72 being rotated in a clockwise direction. The clockwise rotation of lever 75 causes the extension 80 to push valve plate 81 away from nozzle 83 and thereby reduce the pressure in tube 85 and its connecting passages including the reset bellows of thermostats 51 and 57. As the pressure in tube 85 and the reset bellows goes below eight pounds per square inch, device 51 tends to control at a temperature below 73° as does device 57. However, assuming that the mixture of outside air and return air is approximately 73°, and device 51 is set to control at a lower temperature than 73°, then it causes an increase in the pressure in branch 53 and motor 44 sufficient to close valve 42 for there is no need to heat the air in duct 16 if its temperature is already above the value at which the device 51 is set to control. Assuming that device 57 is now reset to control at a temperature of 65° and the air is at about 73°, the reduced pressure in bellows 67 permits spring 63 to cause a clockwise movement of lever 64 and thus operate valve unit 66 to increase its branch pressure and thereby open valve 47. Opening valve 47 permits cooling medium to flow through coil 45 and cool the air in duct 18, the cooler air flowing past thermostat 57 causing a contraction of tube 59, a counterclockwise movement of lever 61 and a decrease in the tension of spring 63 so that the thermostat reaches equilibrium when the air in duct 18 is at the desired temperature of 65°. With the temperature of the air in duct 18 below the temperature value required in the zones 10, 12 and 14, the relatively cool air introduced through ducts 20, 28 and 32 may tend to lower the temperature in these zones whereupon the resulting contraction of the bellows 24, 30 and 34 again causes an adjustment of dampers 21, 29 and 33 in a direction to restore uniform pressures in ducts 16 and 18, resulting in an increase in the set-up pressures for devices 51 and 57. Thus, when the average flow from duct 16, or the duct carrying the heated air, exceeds that from duct 18, or the duct carrying the cooler air, thermostat 51 is reset to control at a higher temperature value so that heat required by the zone can be supplied with a lesser flow of air. Likewise, when the flow from duct 18 is relatively greater than that from 16, device 51 is reset to call for less heat and device 51 is reset to require cooling of the air passing through duct 18. Should the average zone temperature rise sufficiently to cause 80 per cent flow of air from duct 18 and 20 per cent flow of air from duct 16, device 72 will cause a minimum set-up of thermostats 51 and 57. Device 57 will then control at 48° and the resultant temperature of the air mixture supplied to the zones will not be above 55° when the cooling load is at a maximum, thus satisfying design requirements without extreme positioning of the mixing dampers and without undue deviation of zone temperatures.

In the description so far, it has been assumed that the relative humidity has been below the upper limit of 60 per cent for which device 105 is adjusted. However, if the relative humidity should now exceed the value for which device 105 is adjusted, the extension of element 106 permits an opening of nozzle 104 in a manner previously described. Opening of nozzle 104 causes a reduction in pressure in chamber 91 so that its pressure tends to become less than that in chamber 89. When this happens, valve 96 is closed and valve 94 opens, as before described, and tube 69 is connected to tube 103 through chamber 98, valve 94, chamber 95 and tube 102 so that the pressure in set-up bellows 67 depends upon humidity responsive device 105. The reduction in pressure in tube 69 and bellows 67, caused by the open nozzle of device 105, operates to reduce the control point of device 57 and thereby require sufficient additional cooling to cause coil 45 to operate below the dew point of the air passing through it whereby moisture is removed by condensation, hence the air passing to the zone has less total moisture content by the amount of moisture condensed out. The additional cooling provided in duct 18 will also tend to cause a lowering of the temperature in zones 10, 12 and 14 thereby causing an operation of their respective mixing dampers to permit an increased flow of heated air, and thereby cause an increase in the temperature of said heated air, to maintain the temperature in the zones at the desired value. This increase in heat in duct 16 at the same time that air is being cooled in duct 18 is analogous to reheat in the conventional air conditioning system and the system operates to keep the relative humidity below the limiting value for which device 105 is set.

Under favorable circumstances, such as in installations having blowers with a substantially constant volume output, only one of connections 78 or 79 may be used for regulator 72, on the theory that any change in volume in one duct will be reflected in an opposite change of the same amount in the other duct. However, because of fluctuations in blower capacity and because the difference in pressure between the ducts varies twice as much as the change in one duct, the arrangement shown is preferred. Also, instead of tubes 78 and 79 having their ends turned downstream, with lateral openings to respond to static pressure only, they may have open ends, turned upstream as shown in Figure 2, to respond to the difference of dynamic pressures.

While the apparatus of Figure 1 includes a differential pressure responsive device for resetting thermostats 51 and 57, it is obvious that the difference in static pressure is due to the difference in rate of flow in the respective conduits. With this in mind, it is apparent that differential velocity responsive means may be substituted for the differential pressure responsive means, such a modification being shown in Figure 3. In this figure, the dynamic pressure connection 121 of Pitot tube 122 is connected to a bellows 123 and the static pressure connection 124 from Pitot tube 122 is connected to bellows 125 arranged in opposition to bellows 123 and connected by a link 126 having a pivot connection 127. A similar Pitot tube 132 is arranged in conduit 18 and its dynamic pressure conduit 131 is connected to a bellows 133 while the static pressure conduit 134 is connected to bellows 135, this bellows being arranged in opposition to 133 and connected to the same by a link 136 having a pivot connection 137. A T-shaped member 139 having a crossbar extending through the pivot connections 127 and 137 is arranged with its stem portion in socket 141 of a bell crank lever 142 rotatable about a pivot 143 for adjusting valve plate 81 relative to nozzle 83. With this arrangement, when the velocities in ducts 16 and 18 are the same, the pressures exerted by the dynamic pressure bellows 123 and 133 are equal and the opposing pressures exerted by static pressure bellows 125 and 135, respectively, are likewise equal, hence T-member 140 may shift back or forth but there is no twisting of this member, hence bell crank 142 remains stationary. However, should the difference in forces exerted by bellows 123 and bellows 125 exceed the difference in pressure between bellows 133 and 135, due to a higher air velocity in duct 16 than in duct 18, link 126 will tend to be pushed further to the left than will link 136, thereby causing a rotative movement of T-member 139 and a consequent rotation of bell crank 142 in a direction to lower valve plate 81 against nozzle 83 and thus cause an increase in the resetting pressure. The increase in the resetting pressure due to a relatively greater velocity in duct 16 than in duct 18 is similar to the control action described above. Because the static pressure in a duct tends to rise as the dynamic pressure decreases, the difference in such pressures, and thus the response to velocity changes, is made more pronounced by the arrangement of Figure 3A wherein static pressure bellows 125 opposes static pressure bellows 135 and dynamic pressure bellows 123 opposes dynamic pressure bellows 133. With this arrangement, an increase in velocity in duct 16 causes an increased dynamic pressure in bellows 123 and a decreased static pressure in bellows 125, while the decreased velocity in duct 18 results in a decreased dynamic pressure in bellows 133 and an increased static pressure in bellows 135, thus causing a motion of T-member 139 in a direction to close nozzle 83 and increase the resetting pressure. Likewise, a higher velocity in duct 18 than in 16 will cause a movement of member 139 in a direction to decrease the resetting pressure. Thus, as pointed out above, instead of resetting controllers 51 and 57 in response to differential pressure, differential velocities may be used instead.

Likewise, the resetting pressure may be controlled as a function of the velocity in one duct, as shown in Figure 4, wherein Pitot tube 122 is located in duct 16 and is connected to bellows 123 and 125, as before. Bellows 123 and 125 are connected by a link 128 which in turn is connected to a pivoted lever 129 biased in a nozzle opening direction by a light spring 130. The upper end of lever 129 is arranged to engage the under side of nozzle plate 81 in a direction to open nozzle 83 when the velocity in duct 16 is low and to close said nozzle when a predetermined high velocity is reached, tube 85 being connected for resetting devices 51 and 57 in the same manner as above.

A simpler form of differential velocity control apparatus is shown in Figure 5 wherein a vane 151 is attached to a crank lever 152 arranged in duct 16 and a similar vane 153 carried by a crank lever 154 is arranged in duct 18. Sockets 155 and 156 of levers 152 and 154, respectively, receive the crossbar 140 of T-member 139 and, upon a variation in velocity in ducts 16 and 18 wherein the velocities rise and fall equally, T-member 139 is merely shifted back and forth in socket 141 of bell crank 142, bell crank 142 remaining stationary. However, upon the velocity in duct 16, for instance, exceeding that in duct 18, vane 151 is pivoted more than 153 thus causing a twisting of T-member 139 and a consequent rotation of bell crank 142 in a direction to permit nozzle plate 81 to move closer to nozzle 83, as above. Thus, an increase in velocity in duct 16 results in a higher resetting pressure and thus higher control points for thermostats 51 and 57. Obviously, a single vane may be used to control the resetting pressure by arranging it to actuate a valve operating lever such as 129 in Figure 4.

Referring to Figure 6, the differences in air velocities in ducts 16 and 18 may also be sensed by pivoted vanes 151 and 153, as above, or other suitable velocity responsive means, carried by crank arms 161 and 163, respectively, which carry wipers 164 and 165 of rheostats 158 and 159. Rheostats 158 and 159 are connected to function as a voltage dividing potentiometer for controlling a proportioning motor 195 which operates potentiometers 208 and 209. Potentiometers 208 and 209 are connected to operate, in sequence as shown or simultaneously, proportioning motors 210 and 262. Motor 210 is arranged to adjust, or reset, the setting of a proportioning temperature controller 213 by means of pinion 211 and rack 212, controller 213 having a bulb 214 responding to the temperature in duct 18. Controller 213 is connected, in cooperation with a humidity responsive controller 260, to control motor 249 of valve 247 in pipe 46 and thus control the flow of cooling fluid to coil 45. Likewise, potentiometer 209 is connected to control proportioning motor 262 which adjusts, by pinion 263 and rack 264, controller 265 having a bulb 266 in duct 16. Device 265 controls proportioning motor 268 of valve 242 in pipe 41 and thus controls the flow of heating medium to coil 40. Motors 210, 262, 249 and 268 are similar to 195 hence the following description of the operation of motor 195 applies equally well to them.

In operation, upon energizing transformer 171, the control circuit for proportioning motor 195 is energized by the following circuit: secondary winding 170 of transformer 171, wire 172, wire 173, wiper 174, the left hand portion of resistor 175, wire 176, winding 177 of balanced relay 178, resistor 180, wire 181, resistor 167 of rheostat 159, wiper 165, wire 168, wire 169 and the other terminal of secondary winding 170. From wiper 174, a parallel circuit comprises the right hand portion of resistor 175, wire 182, winding 183 of relay 178, resistor 185, wire 186, resistor 166 of rheostat 158, wiper 164 and wire 169 where this circuit joins with that above described. With the present apparatus energized and with the wiper 174 in the middle of resistor 175 and rheostats 158 and 159 equally adjusted, there is equal current flow through windings 177 and 183 of relay 178 hence there is no operation of said relay. If the air velocity in ducts 16 and 18, assuming that the blower is operating, now be varied equally, vanes 151 and 153 will be equally deflected and rheostats 158 and 159 will be equally adjusted, hence the control circuit of motor 195 remains in balance.

A demand for more heat for the zones, reflected in an increase in air velocity in duct 16 results in a further deflection of vane 151 and movement of wiper 164 to the left across resistor 166, thereby diminishing the resistance in the circuit including winding 183 of relay 178. Because of the diminished resistance in this branch of the circuit, the right hand leg of relay 178 is more strongly attracted, thereby moving relay switch blade 188 into engagement with contact 191 and causing an energizing of the field windings of motor 195 by the following circuit: secondary winding 170 of transformer 171, wire 189, relay switch blade 188, contact 191, wire 196, motor winding 197, wire 172 and the other end of secondary winding 170. At the same time, the other winding of the motor is energized from wire 196 through capacitor 198, winding 194 and wire 172 to the transformer. This will be recognized as a common energizing circuit for a two phase motor. Upon energizing the motor winding as above described, armature 205 is caused to rotate so that output shaft 206 is driven by armature 205 through gear train 207 in a direction to move wiper 174 to the left across resistor 175 and thereby rebalance the circuits through relay 178 by decreasing the resistance in the branch containing winding 177 and increasing the resistance in the branch including winding 183. Upon a balance in these branch circuits being attained, blade 188 is then moved out of engagement with contact 191 and armature 205 is stopped. At the same time that wiper 174 was moved to the left across resistor 175, potentiometer 209 was adjusted in a similar fashion to control motor 262 in a manner to raise the temperature setting for controller 265 and thus require a higher temperature in duct 16. Controller 265 then controls motor 268 of valve 242 in a manner to control the flow of heating medium through pipe 41 to give the desired higher temperature, the controlling circuit including potentiometer 209 and motor 262 and the circuit between controller 265 and motor 268 being essentially the same circuit used for controlling motor 195 with the exception that a unitary potentiometer is used rather than the two rheostats connected to operate as a potentiometer. Simultaneous with the adjusting of potentiometer 209, potentiometer 208 is likewise adjusted but, as shown, a movement to the left of the wiper of potentiometer 208 has no effect on the balance of its controlling circuit because the left portion of this potentiometer comprises a contact bar, the right hand portion of potentiometer 209 similarly comprising a contact bar or slide portion. Obviously, potentiometers 208 and 209 can be entirely conventional so that both motors 262 and 210 will be simultaneously adjusted by operation of motor 195, with overlapping of the heating and cooling sequences being prevented by a judicious selection of the amount of reset and the initial control point adjustments, as described in the embodiment of Figure 1.

Should there be a demand for more cooling instead of heating, as above described, and vane 153 thereby be deflected more than vane 151, the resistance in the branch of the controlling circuit including winding 177 is diminished and the switch blade 188 of relay 178 engages contact 190 to thereby energize winding 194 of the motor directly from wire 193 and winding 197 is energized through capacitor 198, causing armature 205 to rotate in an opposite direction, this being a typical reversible two phase motor. The opposite rotation of armature 205 causes output shaft 206 to rotate in a direction to advance wiper 174 to the right across resistor 175 to thereby rebalance its controlling circuit and stop the motor 205. This direction of rotation has no effect on potentiometer 209 because the right hand portion of the same is a mere slide contact portion but the adjustment of potentiometer 208 is effective to control motor 210 to adjust controller 213 to a lower control point to thereby require more cooling for the air in duct 18. Controller 213, instead of being connected directly to motor 249, is connected through a double potentiometer of humidity responsive device 260 by a limit control or compensated circuit 243. With this circuit, so long as the relative humidity affecting device 260 is below a desired value, this device has no effect and controller 213 regulates motor 249 in a manner to obtain more cooling by permitting more cooling medium to flow through pipe 46 to the cooling coil. However, upon the relative humidity rising beyond said value, device 260 then further adjusts motor 249 to require additional cooling with the eventual result that the cooling coil will be operated below the dew point to condense out excess water, in a manner described in the embodiment of Figure 1. In this event, the extra cooling will tend to diminish the cooling demand in the zones and increase the heating demand with the result that the air velocity in duct 16 will increase and that in 18 diminish, thereby causing the adjusting of controllers 265 and 213 to higher control points. However, because controller 213 is no longer in sole control of valve 249, the cooling will continue and the additional heat called for by controller 265 will thus serve as reheat.

As in the previous examples, under favorable circumstances, a single vane 151 in duct 16 may be directly connected to wiper blade 271 of potentiometer 272, potentiometer 272 being connected by wires 169, 181 and 186 to control motor 195 in the same manner as above described.

Further, if desired, rheostats 158 and 159, connected to operate as a voltage dividing potentiometer, or potentiometer 272, may be connected directly to motors 262 and 210 to operate them in parallel and may even be connected to operate motors 268 and 249 in parallel, motors 195, 262, 210 and controllers 265 and 213 being eliminated.

Because various other substitutions and arrangements readily appear to those skilled in the art, upon a study of the present specification and drawings, the present invention is to be defined only by the appended claims.

I claim as my invention:

1. In an air conditioning system for a plurality of zones, a pair of ducts for delivering tempered air to said zones, blower means for circulating air through said ducts, heater means for heating the air in one of said ducts, cooling means for cooling the air in the other of said ducts, branch means for diverting air from each of said ducts to each of said zones, mixing damper means for controlling each of said branch means for proportioning the flow of air delivered from each of said ducts to each of said zones, a submaster type thermostat in each of said ducts responsive to the temperature of the air in said ducts for controlling, respectivey, the heater means and the cooling means, means responsive to the difference in static pressures in said ducts for adjusting said submaster thermostats, apparatus responsive to relative humidity, and means connecting said apparatus in controlling relation to said cooling means in a manner to exercise control of said cooling means when said relative humidity varies beyond a predetermined value.

2. In air conditioning apparatus for a plurality of zones, a pair of ducts for delivering tempered air to said zones, blower means for circulating air through said ducts, temperature changing means in at least one of said ducts, zone branch means for diverting air from each of said ducts to each of said zones, damper means for controlling each of said branch means by adjusting the relative volumes of air delivered from each of said ducts through said branch means, thermostatic means responsive to the temperature of the air in said one duct only downstream of said temperature changing means and connected in controlling relation to said temperature changing means, and means responsive to the difference in static and dynamic pressure in at least one of said ducts for midifying the controllong relation between said thermostatic means and said temperature changing means.

3. In air conditioning apparatus for a plurality of zones, a pair of ducts for delivering air to said zones, blower means for circulating air through said ducts, temperature changing means for the air in at least one of said ducts, zone branch means for diverting air from each of said ducts to each of said zones, damper means for controlling each of said branch means by adjusting the relative volumes of air delivered from each of said ducts through said branch means, pivoted vane means located in at least one of said ducts and movable in response to air velocity, and control means actuated by said pivoted means connected in controlling relation to said temperature changing means.

4. In an air conditioning system for a plurality of zones, a pair of ducts for delivering tempered air to said zones, blower means for circulating air through said ducts, heater means for heating the air in one of said ducts, cooling means for cooling the air in the other of said ducts, branch means for diverting air from each of said ducts to each of said zones, mixing damper means for controlling said branch means for proportioning relative volumes of air delivered from each of said ducts to each of said zones, a submaster type thermostat in each of said ducts responsive to the temperature of the air in said ducts for controlling, respectively, the heater means and the cooling means, means responsive to the difference in air velocity of the air flowing in each of said ducts for adjusting said submaster type thermostat, apparatus responsive to relative humidity, and means connecting said apparatus in controlling relation to said cooling means in a manner to exercise control of said cooling means when said relative humidity exceeds a predetermined value.

5. In an air conditioning system for a plurality of zones, a pair of ducts for delivering tempered air to said zones, blower means for circulating air through said ducts, heater means for heating the air in one of said ducts, branch means for diverting air from each of said ducts to each of said zones, mixing damper means for controlling each of said branch means for proportioning the air delivered from each of said ducts to each of said zones, a submaster type thermostat responsive to the air temperature in said one duct and connected in controlling relation to said heating means, said thermostat including an adjusting motor, and movable means responsive to the difference in air velocity in said ducts for operating said motor and thereby adjusting said submaster type thermostat in a manner to increase the heating effects of the air in said one duct when the air velocity in said one duct exceeds that in the other duct and to decrease said heating when the velocity of air in said other duct is the higher.

6. In air conditioning apparatus for a plurality of zones, a pair of ducts for delivering air to said zones, blower means for circulating air through said ducts, cooling means for the air in at least one of said ducts, zone branch means for diverting air from each of said ducts to each of said zones, damper means for controlling each of said branch means by adjusting the relative volumes of air delivered from each of said ducts to said branch means, means movable in response to the difference in air velocity in said ducts, control means operated by said movable means and connected in controlling relation to said air cooling means, and means responsive to relative humidity connected in a manner to assume dominating control of the controlling connection between said velocity responsive means and said cooling means.

7. In an air conditioning system for a plurality of zones, a pair of ducts for delivering tempered air to said zones, blower means for circulating air through said ducts, temperature changing means for tempering the air in one of said ducts, zone branch means for diverting air from each of said ducts to each of said zones, damper means for controlling each of said branch means for adjusting the relative volumes of air delivered from each of said ducts through said branch means, and means disposed in the path of air flow of at least one of said ducts responsive to the velocity of the air being delivered by said duct connected in controlling relation to said temperature changing means.

8. In an air conditioning system for a plurality of zones, a pair of ducts for delivering tempered air to said zones, blower means for circulating air through said ducts, heater means for heating the air in one of said ducts, cooling means for cooling the air in the other of said ducts, branch means for diverting air from each of said ducts to each of said zones, mixing damper means for controlling each of said branch means for adjusting the relative volumes of air delivered from each of said ducts to each of said zones, a submaster type thermostat in each of said ducts responsive to the temperature of the air in said ducts for controlling the heater means and the cooling means, means responsive to the relative air volumes being delivered by said ducts for adjusting said submaster thermostats, apparatus responsive to relative humidity, and means connecting said apparatus in controlling relation to said cooling means in a manner to exercise control of this cooling means when the relative humidity varies beyond a predetermined value.

9. In air conditioning apparatus for a plurality of zones, a pair of ducts for delivering tempered air to said zones, blower means for circulating air through said ducts, temperature changing means in at least one of said ducts, zone branch means for diverting air from each of said ducts to each of said zones, damper means for controlling each of said branch means by adjusting the relative volumes of air delivered from each of said ducts to said branch means, thermostatic means responsive to the temperature of the air in said one duct only and located a short distance downstream of said temperature changing means and connected in controlling relation to said temperature changing means, and means responsive to the relative volumes of air passing through said ducts connected to said thermostatic means in a manner to adjust the controlling connection between said thermostatic means and said temperature changing means.

10. Control apparatus for a double duct air conditioning system comprising, in combination, a plurality of temperature responsive control devices located in said ducts and adjusted to respond to relatively high and low temperatures respectively, motor means for adjusting each of said devices, a plurality of devices responsive to air velocity in said ducts, means connecting said plurality of air velocity responsive devices in controlling relation to the motors of said temperature responsive devices for adjusting said temperature responsive devices in response to differences in air velocity, and means responsive to relative humidity connected in controlling relation to the motor of the temperature responsive device adjusted to respond to the relatively low temperature.

11. In air conditioning apparatus for a plurality of zones, a pair of ducts for delivering air to said zones, temperature changing means in one of said ducts, zone branch means for diverting air from each of said ducts to each of said zones, means for controlling the flow of air through said branch means, pivoted means located in each of said ducts and movable the direction of air flow in each of said ducts for responding to the velocity of air flow in said ducts, and means responsive to the difference in movement of said pivoted means for controlling said temperature changing means.

12. In air conditioning control apparatus for a double duct system having a temperature changing means in one of said ducts, air velocity responsive means for at least one of said double ducts, motor operated means for proportionally controlling said temperature changing means, an electrical network circuit for proportionally controlling said motor means, and means operable by said velocity responsive means for altering the balance of said network circuit and thereby adjusting the controlling relation between said network and said motor.

13. In air conditioning control apparatus for a double duct system, a control device having a shiftable throttling range constructed and arranged for proportionally controlling a motor, a pair of members each located in a different one of the above ducts and movable in response to air velocity in the ducts, and means connecting said members to said device for shifting the throttling range of said device in response to differences in the movements of said members.

FRANK R. FITZGERALD.

REFERENCES CITED

The following references are of record in the file of this patent:

UNITED STATES PATENTS

| Number | Name | Date |
|---|---|---|
| 2,183,874 | Shivers | Dec. 19, 1939 |
| 2,210,868 | Larson | Aug. 6, 1940 |
| 2,254,185 | Newton | Aug. 26, 1941 |
| 2,363,595 | Joesting | Nov. 28, 1944 |
| 2,440,052 | Lingen et al. | Apr. 20, 1948 |
| 2,495,861 | Newton | Jan. 31, 1950 |